US012458045B2

(12) United States Patent
Bell et al.

(10) Patent No.: US 12,458,045 B2
(45) Date of Patent: *Nov. 4, 2025

(54) COMPOSITIONS AND COMESTIBLES

(71) Applicant: PepsiCo, Inc., Purchase, NY (US)

(72) Inventors: Zena Bell, Hartsdale, NY (US); Thomas Lee, Scarsdale, NY (US); Gregory Yep, New Canaan, CT (US)

(73) Assignee: PepsiCo, Inc., Purchase, NY (US)

( * ) Notice: Subject to any disclaimer, the term of this patent is extended or adjusted under 35 U.S.C. 154(b) by 115 days.

This patent is subject to a terminal disclaimer.

(21) Appl. No.: 18/468,877

(22) Filed: Sep. 18, 2023

(65) Prior Publication Data

US 2024/0156132 A1 May 16, 2024

Related U.S. Application Data

(63) Continuation of application No. 15/941,927, filed on Mar. 30, 2018, now Pat. No. 11,800,883, which is a continuation of application No. 13/894,216, filed on May 14, 2013, now abandoned.

(51) Int. Cl.
| | |
|---|---|
| A23L 2/385 | (2006.01) |
| A23L 2/56 | (2006.01) |
| A23L 2/60 | (2006.01) |
| A23L 2/68 | (2006.01) |
| A23L 27/30 | (2016.01) |
| A23L 29/30 | (2016.01) |

(52) U.S. Cl.
CPC ............ A23L 2/385 (2013.01); A23L 2/56 (2013.01); A23L 2/60 (2013.01); A23L 2/68 (2013.01); A23L 27/34 (2016.08); A23L 27/36 (2016.08); A23L 29/37 (2016.08)

(58) Field of Classification Search
CPC ............................ A23L 27/33; A23L 27/36
See application file for complete search history.

(56) References Cited

U.S. PATENT DOCUMENTS

| | | | |
|---|---|---|---|
| 3,552,726 | A | 1/1971 | Kraft |
| 4,956,191 | A | 9/1990 | Ueda et al. |
| 7,579,032 | B2 | 8/2009 | Lee et al. |
| 11,800,883 | B2 | 10/2023 | Bell et al. |
| 2002/0197371 | A1 | 12/2002 | Lee et al. |
| 2005/0106305 | A1 | 5/2005 | Abraham et al. |
| 2007/0082106 | A1 | 4/2007 | Lee et al. |
| 2007/0110868 | A1 | 5/2007 | Lee et al. |
| 2007/0116823 | A1 | 5/2007 | Prakash et al. |
| 2007/0128311 | A1 | 6/2007 | Prakash et al. |
| 2008/0226770 | A1 | 9/2008 | Lee et al. |
| 2008/0226773 | A1 | 9/2008 | Lee |
| 2008/0226789 | A1 | 9/2008 | Roy et al. |
| 2008/0226797 | A1 | 9/2008 | Lee et al. |
| 2008/0226798 | A1 | 9/2008 | Talebi et al. |
| 2008/0226804 | A1 | 9/2008 | Talebi et al. |
| 2008/0286433 | A1 | 11/2008 | Simpson et al. |
| 2009/0062215 | A1 | 3/2009 | Tokuda et al. |
| 2009/0304891 | A1 | 12/2009 | Fujihara et al. |
| 2010/0040738 | A1 | 2/2010 | Smith |
| 2010/0166678 | A1 | 7/2010 | Iida et al. |
| 2010/0285197 | A1 | 11/2010 | Fisher et al. |
| 2011/0183056 | A1 | 7/2011 | Morita et al. |
| 2012/0076908 | A1 | 3/2012 | Fujihara et al. |
| 2012/0189739 | A1 | 7/2012 | Rathke et al. |
| 2013/0071521 | A1 | 3/2013 | Lee et al. |
| 2014/0099403 | A1 | 4/2014 | Prakash et al. |
| 2014/0171519 | A1 | 6/2014 | Prakash et al. |
| 2014/0227421 | A1 | 8/2014 | Markosyan |
| 2014/0272068 | A1 | 9/2014 | Prakash et al. |
| 2014/0342043 | A1 | 11/2014 | Bell et al. |
| 2015/0110940 | A1 | 4/2015 | Lee et al. |

FOREIGN PATENT DOCUMENTS

| | | |
|---|---|---|
| CN | 1510993 A | 7/2004 |
| CN | 101662960 A | 3/2010 |
| CN | 101742925 A | 6/2010 |
| CN | 101965999 A | 2/2011 |
| CN | 102216313 A | 10/2011 |
| CN | 103159808 A | 6/2013 |
| EP | 2090180 A1 | 8/2009 |
| EP | 3009010 A1 | 12/2012 |
| JP | 2010-521163 A | 6/2010 |
| JP | 2010-521166 A | 6/2010 |
| JP | 2011-530286 A | 12/2011 |
| JP | 2012-504552 A | 2/2012 |
| RU | 2423884 C2 | 6/2010 |

(Continued)

OTHER PUBLICATIONS

International Search Report and Written Opinion for PCT Application No. PCT/US14/34167 dated Aug. 27, 2014.
Third-Party Submission submitted in U.S. Appl. No. 13/894,216, Bell, et al., filed May 14, 2013.
Office Action mailed Mar. 31, 2015, in U.S. Appl. No. 13/894,200, Bell, et al., filed May 14, 2013.
Office Action mailed May 13, 2015, in U.S. Appl. No. 13/894,200, Bell, et al., filed May 14, 2013.
Office Action mailed Jul. 17, 2015, in U.S. Appl. No. 13/894,200, Bell, et al., filed May 14, 2013.

(Continued)

*Primary Examiner* — Jeffrey P Mornhinweg

(74) *Attorney, Agent, or Firm* — Sterne, Kessler, Goldstein & Fox P.L.L.C.

(57) ABSTRACT

D-psicose/erythritol compositions comprise, in combination, D-psicose and erythritol as sweeteners together with one or more other edible ingredients. Comestibles are provided, including beverage products and other food products, comprising the novel D-psicose/erythritol compositions. D-psicose and erythritol may each be present in a comestible in a concentration sufficient independently of the other to perceptibly sweeten the composition. An additional sweetener component and other ingredients may be included in the formulation.

18 Claims, No Drawings

(56) References Cited

FOREIGN PATENT DOCUMENTS

| | | |
|---|---|---|
| RU | 2505244 C2 | 1/2014 |
| WO | WO-02087359 A1 | 11/2002 |
| WO | WO-2002087358 A1 | 11/2002 |
| WO | WO-2008057968 A2 | 5/2008 |
| WO | WO-2008112839 A1 | 9/2008 |
| WO | WO-2008112852 A1 | 9/2008 |
| WO | WO-2008112866 A1 | 9/2008 |
| WO | WO-2008112967 A1 | 9/2008 |
| WO | WO-2008147727 A1 | 12/2008 |
| WO | WO-2010038911 A1 | 4/2010 |
| WO | WO-2011046423 A1 | 4/2011 |
| WO | WO-2011090709 A1 | 7/2011 |
| WO | WO-2012082677 A1 | 6/2012 |
| WO | WO-2013036366 A1 | 3/2013 |
| WO | WO-2013096420 A1 | 6/2013 |
| WO | WO-2013102793 A2 | 7/2013 |
| WO | WO-2014186250 A1 | 11/2014 |

OTHER PUBLICATIONS

Office Action mailed Jul. 10, 2015, in U.S. Appl. No. 14/504,841, Lee, et al., filed Oct. 2, 2014.
Office Action mailed Jan. 14, 2016, in U.S. Appl. No. 13/894,200, Bell, et al., filed May 14, 2013.
Office Action mailed Jul. 28, 2016, in U.S. Appl. No. 13/894,200, Bell, et al., filed May 14, 2013.
Office Action mailed Mar. 28, 2016, in U.S. Appl. No. 14/504,841, Lee, et al., filed Oct. 2, 2014.
Office Action mailed Sep. 14, 2016, in U.S. Appl. No. 14/504,841, Lee, et al., filed Oct. 2, 2014.
Office Action mailed Mar. 29, 2017 in U.S. Appl. No. 14/504,841, Lee, et al., filed Oct. 2, 2014.
Ohta, M., et al., "Characterization of Novel Steviol Glycosides from Leaves of Stevia rebaudiana Morita," Journal of Applied Glycoscience 57(3):199-209, The Japanese Society of Applied Glycoscience, England (Aug. 2010).
Stuckey, B., "Sweet," in *Taste What You're Missing: The Passionate Eater's Guide to Why Good Food Tastes Good*, p. 217, Simon & Schuster, Inc., United States (Mar. 2012).
Office Action mailed Mar. 6, 2020 in U.S. Appl. No. 15/941,927, Bell, et al., filed Mar. 30, 2018.
Office Action mailed Apr. 4, 2017 in U.S. Appl. No. 13/894,216, Bell, et al., filed May 14, 2013.
Office Action mailed Nov. 7, 2016 in U.S. Appl. No. 13/894,216, Bell, et al., filed May 14, 2013.
Office Action mailed Mar. 17, 2016 in U.S. Appl. No. 13/894,216, Bell, et al., filed May 14, 2013.
Office Action mailed Aug. 12, 2015 in U.S. Appl. No. 13/894,216, Bell, et al., filed May 14, 2013.
Office Action mailed Apr. 16, 2015 in U.S. Appl. No. 13/894,216, Bell, et al., filed May 14, 2013.
Office Action mailed Dec. 31, 2014 in U.S. Appl. No. 13/894,216, Bell, et al., filed May 14, 2013.
Third-Party Submission submitted in U.S. Appl. No. 15/941,927, Bell, et al., filed Mar. 30, 2018.

COMPOSITIONS AND COMESTIBLES

FIELD OF THE INVENTION

This invention relates to novel edible compositions and to novel comestibles such as beverages and other foods comprising such novel compositions. The disclosure includes, for example, diet carbonated soft drinks ("CSDs"), e.g., diet cola, non-carbonated beverages, e.g., dairy beverages and hydration beverages having added electrolytes, and grain products, e.g., dry cereals, snack bars, etc.

BACKGROUND

There is a need for new food and beverage formulations which can adequately meet one or a combination of objectives including nutritional characteristics, flavor, shelf life, and/or other market demands. In particular, there is market demand for products having lower calorie content with good taste profiles.

The development of new formulations, for example, new formulations for diet or other low-calorie sweetened beverages, employing alternative sweeteners, flavorants, flavor enhancing agents and the like presents challenges in achieving a sugar-like sweetness and in addressing associated off-tastes introduced by the alternative sweeteners, or other ingredients in the formulation. Thus, for example, development of new diet (i.e., fewer than 5 calories per 8 oz. serving) or reduced calorie formulations for sweetened beverages, e.g., carbonated diet cola beverages with good flavor and sweetness profile, has faced obstacles. U.S. Pat. No. 4,956,191 suggests that carbonated beverages which contain blends of saccharin or stevia extract with aspartame tend to be less organoleptically pleasing than those containing sugar. Many alternative sweeteners, in addition to providing sweetness, have been found less than wholly satisfactory because in man formulations they exhibit unacceptably low up front sweetness and/or lingering or other off-tastes.

It is an object of one aspect of the present disclosure to provide new compositions able to contribute to acceptable taste profiles for beverages and other foods. It is an object of other aspects to provide novel sweetened comestibles, such as beverages and other foods, including, for example, beverages and other foods sweetened at least partly with non-nutritive, potent sweeteners. It is an object of some embodiments of the invention (that is, not necessarily all embodiments of the invention) to provide diet and low calorie carbonated soft drinks, e.g. diet cola beverages, and syrups for making such beverages, having desirable taste properties and lower caloric content than comparable beverages sweetened with sugar. It is an object of at least certain embodiments of the invention to provide sweetened, organic and/or all-natural beverages and other sweetened food products with good taste profiles. These and other objects, features and advantages of the invention or of certain embodiments of the invention will be apparent to those skilled in the art from the following disclosure and description of exemplary embodiments.

SUMMARY

In accordance with a first aspect, compositions are disclosed comprising, in combination, D-psicose and erythritol together with one or more other edible ingredients. D-psicose and erythritol in combination have been found to provide surprising taste improvement in beverages and other foods. In beverages and other foods sweetened with natural, potent sweeteners, for example, such as beverages sweetened with rebaudioside A which typically causes an undesirable lingering bitter taste, incorporating D-psicose and erythritol together in the beverage is found to provide both improved upfront sweet taste and reduced (e.g., masked) lingering bitter. These taste improvements are found to contribute synergistically to achieving an acceptable taste profile in beverages and other foods, e.g., diet or low-calorie beverages and other foods. Certain embodiments of the compositions in accordance with this first aspect of the present disclosure may be packaged and sold in bulk for use in commercial food production. For example, certain embodiments comprising D-psicose and erythritol, with or without a potent sweetener ingredient, may be provided as a table top sweetener for consumers, suitable to be used in cooking or to be added by a consumer to a beverage or other food. Such sweetener composition can be packaged and sold in bulk. Alternatively, in certain embodiments the sweetener composition is packaged in single serving packets to be opened at the time of use by the consumer. The at least one other edible ingredient of the sweetener composition, in accordance with certain embodiments, may, for example, be a sweetener component (e.g., flavorant at a concentration below, at or barely above its threshold perception level or in an amount readily perceptible to the consumer), a flowing agent, a coloring agent, and/or other suitable ingredient(s), or a combination of any two or more of them. Such compositions may be packaged in individual serving sizes to be opened and added by the consumer to a beverage or other food in the course of food preparation or at the time of consumption. Compositions comprising D-psicose and erythritol in accordance with this disclosure may be referred to below in some cases as D-psicose/erythritol compositions.

In certain exemplary embodiments, a sweetener is combined with the D-psicose and erythritol, optionally also with one or more other edible ingredients in the composition. As further discussed below, suitable sweeteners include, for example, potent sweeteners and/or nutritive sweeteners, e.g., a sweetening amount of one or more rebaudiosides. In certain embodiments of the D-psicose/erythritol compositions disclosed here that are suitable for use as a sweetener or taste modifier to be added to beverages or other foods by the consumer, the at least one other edible ingredient referred to above may be, for example, a bulking agent.

In accordance with another aspect, comestibles are disclosed comprising, in combination, D-psicose and erythritol together with at least one other food ingredient. As used here, the term "food ingredient" means any edible substance suitable to provide flavor, nutrition, color, bulk, texture or other mouthfeel, stability, acidity, thickening, anti-caking or the like, or a combination of any two or more of these. It should be understood that reference here to incorporating D-psicose and erythritol together in a beverage or other food does not require that the two ingredients be added simultaneously or as a pre-mixed combination, although in certain embodiments they may be mixed together prior to being added to other ingredients. In certain embodiments of the improved beverages and other foods disclosed here, D-psicose and erythritol each is present in a sweetening amount, that is, D-psicose and erythritol each is present in a concentration sufficient independently of the other to perceptibly sweeten the composition.

In certain embodiments at least one food ingredient in the comestible provides digestible nutrition. Exemplary food ingredients suitable for use in at least certain of the novel comestibles disclose here (either as the nutritional ingredient or in addition to that ingredient in the formulation) include grain components, carbonated or non-carbonated water, sweeteners, e.g., a sweetening amount of at least one nutritional sweetener and/or a sweetening amount of a potent (i.e., non-nutritional) sweetener, flavorants, acidulants, colorants, bulking agents, etc. In certain exemplary embodiments, the comestibles disclosed here are packaged in a single serving size, that is, a portion size suitable to be consumed at one time by a single consumer. Examples of such single serving size comestibles include snack bars, packets of instant or quick cooking oatmeal or other grain product, etc. D-psicose and erythritol are non-potent sweeteners and in at least certain embodiments of the comestibles of the present disclosure, each may be present in a sweetening amount. That is, D-psicose and erythritol each may be present in such embodiments in a concentration sufficient independently of the other to perceptibly sweeten the comestible.

Certain embodiments of the comestibles disclosed here are food products, including, for example, solid foods, gels, beverages, etc. The beverages include, for example, juice beverages (e.g., beverages comprising one or more fruit juices and/or one or more vegetable juices), hydration beverages, carbonated soft drinks (CSDs), frozen beverages, frozen carbonated beverages, diet or other reduced calorie beverages, etc. It will be recognized by those skilled in the art that there is overlap between these categories. Certain embodiments od the beverages disclosed here are ready-to-drink ("RTD") beverages, for example, diet carbonated soft drinks ("CSDs"), e.g., diet cola, non-carbonated beverages, e.g., dairy beverages or hydration beverages having added electrolytes. Certain embodiments of the comestibles disclosed here are concentrates or syrups for producing RTD beverages, e.g., syrups to be diluted with carbonated water to produce CSDs. Certain embodiments of the comestibles disclosed here are gels or grain products, e.g., ready-to-eat sweetened dry cereals, snack bars, corn chips, etc.

Certain exemplary embodiments of the comestibles disclosed here comprising D-psicose and erythritol in combination together with at least one other food ingredient are diet cola CSDs comprising sweetener (additional to the D-psicose and erythritol), e.g., a potent natural sweetener. In some embodiments, as further discussed below, the additional sweetener comprises one or more rebaudiosides as sweeteners (i.e. in an amount sufficient to provide perceptible sweetening to the diet cola CSD), e.g., any of the sweet rebaudiosides disclosed in US Patent Application Publication No. 2011/0183056 of Morita et al. (U.S. patent application Ser. No. 13/122,232). Suitable rebaudiosides include, for example, rebaudioside A, rebaudioside B, rebaudioside C, rebaudioside D, rebaudioside E, rebaudioside M and any combination of any two or more of them. Certain embodiments of such diet cola CSD's comprise a sweetening component as the additional sweetener, comprising rebaudioside M together with one or more other rebaudioside sweeteners and/or other potent and/or nutritive sweeteners. Certain embodiments of such diet cola CSDs comprise a sweetening component (again, meaning additional to the D-psicose/erythritol composition) comprising or consisting (or consisting essentially of) rebaudioside A, rebaudioside D and rebaudioside M as additional sweeteners (i.e., each in an amount sufficient to provide perceptible sweetening to the diet cola CSD). Those skilled in the art will understand from the present disclosure that alternative or additional sweeteners may optionally be employed in an additional sweetener component for the diet cola CSD's disclosed here, as well as in other comestibles of the present disclosure.

It will be appreciated by those skilled in the art, given the benefit of the forgoing disclosure and the following further description of D-psicose/erythritol compositions and comestibles comprising a D-psicose/erythritol composition, that at least certain embodiments of the invention have improved or alternative formulations suitable to provide desirable taste profiles, nutritional characteristics, etc. These and other aspects, features and advantages of the invention or of certain embodiments of the invention will be further understood by those skilled in the art from the following description of exemplary embodiments.

DETAILED DESCRIPTION OF CERTAIN EXEMPLARY EMBODIMENTS

As disclosed above, it has been unexpectedly discovered that D-psicose and erythritol can be used in combination in food products for improved taste profile, optionally together with other sweetener ingredients. As discussed further below, the combination of D-psicose sweetener and erythritol sweetener is found to act synergistically to provide advantageous organoleptic properties in foods. For example, as further discussed below, D-psicose/erythritol compositions are found to provide a desirable sweetness profile and taste, including good upfront sweetness and mouthfeel in beverage products. In certain embodiments comprising erythritol and D-psicose in a beverage or other food sweetened with rebaudioside M in combination with rebaudioside A as a sweetener (alone or with yet other sweeteners, e.g., rebaudioside D), erythritol is found to act as a bitterness masking or reducing agent and D-psicose is found to improve the upfront sweetness of formulation.

The beverage products disclosed here include ready-to-drink liquid formulations, beverage concentrates and the like. As used herein, the term "ready-to-drink" refers to a beverage formulated to be ingested as-is. That is, the ready-to-drink beverage requires no dilution or additions prior to ingestion by a consumer. Ready-to-drink beverage products include, e.g., carbonated and non-carbonated soft drinks, fountain beverages, carbonated and non-carbonated frozen ready-to-drink beverages (e.g., diet frozen carbonated beverages), coffee beverages, tea beverages, dairy beverages, powdered soft drinks, as well as liquid concentrates, flavored waters, enhanced waters, fruit juice and fruit juice-flavored drinks, sport drinks, and alcoholic products.

D-psicose/erythritol compositions in accordance with the present disclosure, optionally together with one or more additional sweeteners, are found to provide desirable sweetness profile and taste in CSDs, such as diet cola CSDs. In this regard, as used here, "taste" refers to any or a combination of some or all of the following: sweetness perception, temporal effects of sweetness perception, i.e., on-set and duration, off-tastes, e.g. bitterness and metallic taste, residual perception (aftertaste) and tactile perception, e.g. body and thickness, etc. The perception of flavoring agents and sweetening agents may depend to some extent on the interrelation of elements in a particular formulation. For example, when a large amount of a flavoring agent is used, a small amount of a sweetening agent may be readily perceptible and vice versa. Thus, the oral and olfactory interaction between a flavoring agent and a sweetening agent may involve the interrelationship of elements. Flavor and sweetness may also be perceived separately. As used here in discussing and comparing a beverage embodiment of the current disclosure, the term "comparable beverage sweetened with sugar" means a beverage that has the same formulation (or the same formulation to the extent reasonably commercially feasible) except for (i.e., other than) having the sugar or other nutritional, low potency sweetener replaced entirely or in part by a D-psicose/erythritol composition in accordance with the present disclosure.

Various examples and embodiments of the inventive subject matter disclosed here are possible and will be apparent to persons of ordinary skill in the art, given the benefit of this disclosure. As used in this disclosure, the phrases "certain embodiments," "certain exemplary embodiments," "exemplary embodiments" and similar phrases mean that those embodiments are merely non-limiting examples of the inventive subject matter and that alternative or different embodiments are not being excluded. Unless otherwise indicated or unless otherwise clear from the context in which it is described, alternative elements or features in the embodiments and examples below and in the Summary above are interchangeable with each other. That is, an element described in one example or embodiment may be interchanged or substituted for one or more corresponding element(s) described in another example. Similarly, optional or non-essential features disclosed in connection with a particular embodiment or example should be understood to be disclosed for use in any other embodiments of the disclosed subject matter. More generally, the elements of the examples and exemplary embodiments should be understood to be disclosed generally for use with other aspects, embodiments and examples of the devices and methods disclosed herein. A reference to a component or ingredient being operative, i.e., able to perform one or more functions, tasks and/or operations or the like, is intended to mean that it can perform the expressly recited function(s), task(s) and/or operation(s) in at least certain embodiments, and may well be operative to perform also one or more other functions, tasks and/or operations. While this disclosure includes specific examples, including presently preferred modes or embodiments, those skilled in the art will appreciate that there are numerous variations and modifications within the spirit and scope of the invention as set forth in the appended claims. Each word and phrase used in the claims is intended to include all its dictionary meanings consistent with its usage in this disclosure and/or with its technical and industry usage in any relevant technology area. It should be understood that the term "about" is used throughout this disclosure and the appended claims to account for ordinary inaccuracy and variability, such as in measurement, testing and the like, in product production, etc.

It should be understood that, where context allows, the term "amount" is used here interchangeably with "concentration." As used here, these terms should be understood to mean the amount of the ingredient in question as a weight percent of the total formulation, unless otherwise stated. The ingredient is not necessarily dissolved in the formulation but, rather, may be dispersed or otherwise distributed (homogenously or not) throughout. As used in this disclosure, unless otherwise specified, the term "added" or "combined" and like terms means that the multiple ingredients or components referred to (e.g., oil, emulsifier, preservative, etc.) are combined in any manner and in any order, with or without stirring or the like, with or without heating, etc. For example, one or more ingredients can be dissolved into one or more other ingredients, or sprayed together, etc. As used here, a solution may be a true solution, a slurry, a suspension, or other form of liquid or flowable material. In certain embodiments, for example, materials may be said to be combined to form a homogenous solution. The term "mixing," as used herein includes, but is not limited to, beating, blending, stirring, high shear stirring, low shear stirring, whipping, folding in, sonicating, sifting, pureeing, and the like.

Those of ordinary skill in the art will understand that in certain cases, for convenience, some ingredients are referred to or described here (and "here" should be understood to include the appended claims) by reference to the industry name for the product or to the original form of the ingredient in which it is used in formulating or producing the beverage or other food product. Such original form of the ingredient may differ from the form in which the ingredient is found in the finished beverage product. For example, the ingredient may be referred to in the form it is originally added during production of the food product rather than by the form it has in the finished food product, such as a dissolved or dissociated form or as a reaction product or complex with one or more of the other ingredients in the finished food product (or in an intermediate product in the course of producing the finished food product. Thus, for example, in certain exemplary embodiments of the beverage products according to this disclosure, sucrose and liquid sucrose would typically be substantially homogenously dissolved and dispersed in the comestible products. Likewise, other ingredients identified as a solid, concentrate (e.g., juice concentrate), etc. would typically be homogeneously dispersed throughout the beverage or throughout the beverage concentrate, rather than remaining in their original form. As another example, an ingredient described as a salt may exist in a beverage in dissolved form. Thus, reference to the form of an ingredient of a beverage product formulation should not be taken as a limitation on the form of the ingredient in the beverage product, but rather as a convenient means of describing the ingredient as an isolated component of the product formulation.

D-psicose (CAS No. 23140-52-5) is a monosaccharoid, a C-3 epimer of D-fructose and, as discussed in the Food and Drug Administration's Agency Response Letter GRAS Notice No. GRN 000400, D-psicose is GRAS, that is, it is generally recognized as safe for consumption, e.g., up to a beverage concentration of 2.1 wt. %. It may also be referred to as D-allulose, D-ribo-2-hexulose erythrohexulose, or pseudofructose, and has the formula $C_6H_{12}O_6$. Its structure is shown below:

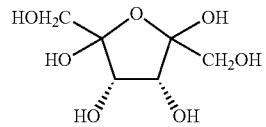

D-psicose is an ultralow-energy monosaccharide sugar and is present in small quantities in agricultural products and commercially prepared carbohydrate complexes. It is found to have a sweet intensity of 0.6×, that is, it has a sweet intensity 0.6 times (or somewhat more than half) the sweetness of the same weight of sugar in water. D-psicose is believed to yield from none to only 0.2 cal/g of metabolic energy in at least certain embodiments of the comestible's disclosed here, that is, at most only 5.0% the metabolic energy of the equivalent sweetening amount of sucrose. It is also believed to be effective in at least certain embodiments to provide the benefit of inhibiting fructose intake in the human body. It has been isolated from the antibiotic psicofuranine and is manufactured commercially from fructose by enzymatic epimerization. D-psicose is commercially available e.g., from C. J. Cheildong Inc. (Korea) and from Sigma-Aldrich, Inc. (United States).

D-psicose and erythritol can be used in the D-psicose/erythritol compositions disclosed here and, correspondingly, in the comestibles disclosed here, in a range of relative amounts. Thus, in certain exemplary embodiments D-psicose and erythritol are present in a weight percent ratio of from 99:1 to 1:99, for example, in a weight percent ratio of from 3:1 to 1:3. In a D-psicose/erythritol composition, for example, the remainder of the composition consists of the one or more other edible ingredients, e.g., any bulking agents, preservatives, diluents, additional sweetener component, etc. In certain exemplary embodiments in accordance with the present disclosure, D-psicose and erythritol are used in a weight ratio of from 99:1 to 1:99, for example in a weight ratio of 90:10 to 10:90, for example in a weight ratio of from 75:25 to 25:75, such as from 60:40 to 40:60, e.g., in equal amounts by weight in the composition. It should be understood that the weight percent of D-psicose or erythritol in a D-psicose/erythritol composition or in a comestible composition according to the present disclosure is determined by dividing its amount by weight in the composition by the entire weight of the composition and converting the resulting value to a percentage value. Thus, for example, the weight percent of D-psicose or erythritol in a comestible is determined by dividing its amount by weight in the comestible by the weight of the entire comestible formulation and converting the resulting value to a percentage value. As disclosed above, while D-psicose and erythritol each may be present in an amount sufficient to provide sweetening to the comestibles disclosed here, it is significant that the D-psicose/erythritol composition provides improved upfront sweetness and reduction of lingering bitter otherwise caused by some potent sweeteners used in food formulations, e.g., rebaudioside A, with resultant synergistic improvement in the taste profile of the beverage or other food product.

D-psicose and erythritol can be used in the comestibles disclosed here in a range of concentrations suitable to the desired taste and sweetness level and the other ingredients included in the formulation. In certain exemplary embodiments of the comestibles D-psicose is present in an amount or concentration of from 0.1 wt. % to 6.0 wt. %, e.g., in an amount of from 0.5 wt. % to 2.1 wt. %, and erythritol is present in an amount of from 0.1 wt. % to 5.0 wt. %, e.g., in an amount of from 0.5 wt. % to 3.5 wt. %. The combined weight percent of D-psicose and erythritol in the D-psicose/erythritol compositions disclosed here is less than 15.0 wt. %, e.g., less than 5.7 wt. %. The remainder of the sweetened comestible consists of the one or more other food ingredients included in the formulation of the comestible. Where the comestible is a beverage, the other ingredient(s) may, for example, be any one ingredient or combination of two or more ingredients such as water, additional sweetener component, flavorants, additional sweetener component, colorants, acidulants, preservatives, vitamins, minerals, electrolytes, digestible or non-digestible dietary fiber, micro-encapsulated nutrients, clouding agents, $CO_2$ (carbonation), buffering salts, etc. In embodiments wherein the comestible is a solid food, for example a grain-based product such as ready-to-eat snack bars, cereal, salty chips, etc., the other ingredient(s) may, for example, be any one or more types of grain or grain components, additional sweetener component, flavorants, additional sweetener component, colorants, preservatives, vitamins, minerals, electrolytes, digestible or non-digestible dietary fiber, micro-encapsulated nutrients, peanut butter, cheese, other dairy components, etc.

Certain embodiments of the D-psicose/erythritol compositions, formulations and products disclosed here further comprise an additional sweetener component. As used herein, the term "additional sweetener component" means a component comprising or consisting of (or consisting essentially of) one or a combination of two or more additional sweeteners. A "sweetener" is a component or ingredient that adds perceptible sweetness to the composition or formulation or product in question. The additional sweetener may have any form suitable to the composition or formulation question. Ingredients suitable for use as an additional sweetener component or as part of an additional sweetener component include, for example, nutritive and non-nutritive, natural and artificial or synthetic sweeteners. The additional sweetener or combination of additional sweeteners may be selected for the desired nutritional characteristics, taste profile for the beverage, mouthfeel and other organoleptic factors. Non-nutritive or potent sweeteners suitable for at least certain exemplary embodiments include, but are not limited to, for example, peptide based sweeteners, e.g., aspartame, neotame and alitame, and non-peptide based sweeteners, for example, sodium saccharin, calcium saccharin, acesulfame potassium, sodium cyclamate, calcium cyclamate, neohesperidin dihydrochalcone, sucralose, sorbitol, mannitol, xylitol, glycyrrhizin, D-tagatose, maltitol, maltose, lactose, fructo-oligosaccharides, Lo Han Guo (e.g., mogrosides, Lo Han Guo powder or Lo Han Guo juice concentrate), xylose, arabinose, isomalt, lactitol, maltitol, trehalose, and ribose, and protein sweeteners such as monatin, thaumatin, monellin, brazzein, L-alanine and glycine, and steviol glycoside sweeteners, e.g., the rebaudiosides identified in the above cited US Patent Application Publication No. 2011/0183056 of Morita et al., such as rebaudioside A, rebaudioside B, rebaudioside C, rebaudioside D, rebaudioside E and rebaudioside M, and mixtures of any two or more of any of these additional sweeteners. In at least certain exemplary embodiments the additional sweetener component can include nutritive, natural crystalline or liquid sweeteners such as sucrose, liquid sucrose, fructose, liquid fructose, glucose, liquid glucose, glucose-fructose syrup from natural sources such as apple, chicory, honey, etc., e.g., high fructose corn syrup, invert sugar, maple syrup, maple sugar, honey, brown sugar, molasses, e.g., cane molasses, such as first molasses, second molasses, blackstrap molasses, and sugar beet molasses, sorghum syrup, Lo Han Guo juice concentrate, mogrosides and/or others. Such sweeteners are present in certain non-diet embodiments of the comestibles disclosed here in an amount of from about 0.1% to about 20% by weight of the comestible, for example, about 6% to about 16% by weight of the beverage, depending upon the desired level of sweetness. To achieve desired uniformity, texture and taste, in certain exemplary embodiments of the natural beverage products disclosed here, standardized liquid sugars as are commonly employed in the food industry can be used. Typically such standardized sweeteners are free of traces of non-sugar solids which could adversely affect the flavor, color or consistency of the beverage product.

For instance, in certain embodiments the sweetening ingredients of the sweetening component (i.e., sweeteners other than D-psicose and erythritose) in the beverage product (e.g., a cola beverage product) consist of both rebaudioside M and one or more other high intensity sweeteners, such as rebaudioside A, rebaudioside B, rebaudioside C, rebaudioside D, rebaudioside E, monatin, thaumatin, monellin, brazzein, L-alanine, glycine, Lo Han Guo or mogrosides (e.g., Lo Han Guo juice concentrate), hernandulcin, phyllodulcin, trilobatin, or a combinations of any two or more of them. In such embodiments, the sweetening ingredients may consist of from 20% by weight to 99.9% by weight rebaudioside M and from 0.1% by weight to 80% by weight (cumulative total) of the other high intensity sweeteners. In other embodiments, the sweetening ingredients may consist of from 50% by weight to 99.9% by weight rebaudioside M and from 0.1% by weight to 50% by weight of the other high intensity sweeteners, or from 80% by weight to 99.9% by weight rebaudioside M and from 0.1% by weight to 20% by weight of other high intensity sweeteners. Moreover, the ratio of rebaudioside M to other high intensity sweeteners may in certain embodiments comprise any blend from 1:5 and 99:1 rebaudioside M to the cumulative total of the other high intensity sweeteners. In certain exemplary embodiments of the ready-to-drink beverages disclosed here, including for example a ready-to-drink diet cola beverage, the beverage product comprises at least about 50 ppm rebaudioside M. Certain exemplary embodiments of the ready-to-drink beverages disclosed here comprise from about 50 ppm to about 600 ppm rebaudioside M, e.g., about 100 ppm, about 200 ppm, about 300 ppm, about 400 ppm, about 500 ppm. Correspondingly higher concentrations of rebaudioside M are used in beverage concentrates or syrups, e.g., from about 100 ppm to 500 ppm or to the solubility limit of Rebaudioside M in the formulation.

It should be understood that description or reference here and elsewhere in this disclosure to a composition or product being sweetened with specific additional sweetener(s), e.g., with one or more rebaudiosides as additional sweetener along with the D-psicose and erythritol, is not meant to indicate that the composition or product necessarily does not contain one or more other ingredients with sweetening properties. For example, a non-sweetening amount of one or more others of the compounds typically found in stevia extracts, e.g., other steviol glycosides, dulcosides, etc. may be present unless stated otherwise. Likewise, there may be a sweetening amount of one or more other sweeteners unless the additional sweetening component is said to consist of (or to consist essentially of) one or more particular named sweetener compounds or ingredients, in which case it would not have a sweetening amount of other sweeteners. The optional additional sweetener component may be used in the D-psicose/erythritols, formulations and products disclosed here in any suitable concentration, depending on the desired degree of added sweetening, the characteristics of the particular composition, formulation or product, and other desired organoleptic effects. For example, in a ready-to-drink ("RTD") beverage additional potent sweetener component may be used, for example, in an amount of from about 0.01 wt. % to 0.1 wt. % of the beverage. In a syrup for dilution to produce an RTD beverage, the concentration would be correspondingly higher. For example, in a syrup suitable for dilution with water in a 1-plus-5 throw (or 1×5 throw), the concentration of the additional sweetener (and other ingredients of the syrup) is six times greater than the concentration in the finished beverage. In certain embodiments of diet cola ready-to-drink carbonated soft drinks disclosed here, the optional additional sweetener component is a potent natural sweetener present in an amount of from about 0.01 wt. % to about 0.08 wt. % of the beverage, such as from about 0.03 wt. % to about 0.06 wt. %, depending largely on the sweetening potency of the additional sweetener, and the desired level of added sweetening. Syrup products for such diet cola ready-to-drink carbonated soft drinks have a correspondingly higher concentration of the additional sweetener component.

Certain embodiments of the beverage products and other comestibles disclosed here comprising D-psicose and erythritol further comprise an additional sweetener component comprising or consisting (or consisting essentially of) any one or more of the rebaudiosides shown in PCT patent application No. 104002121 filed Dec. 10, 2012 by Su Zhou Jing Hong Biotech Co., Ltd. (Wujiang, Jiangsu Province, People's Republic Of China) and corresponding U.S. provisional patent application No. 61/579,016 filed Dec. 22, 2011, the entire contents of which are hereby incorporated by reference herein. Such rebaudiosides include, for example, rebaudioside A, rebaudioside B, rebaudioside C, rebaudioside D, rebaudioside E, rebaudioside M. Such beverage products include, e.g., organic and/or natural ready-to-drink beverages (i.e., beverage products made essentially of only organic and/or only natural ingredients), diet colas and other carbonated soft drinks, hydration beverages, and other ready-to-drink beverages. Such beverage products also include, beverage syrups, that is, concentrates to be diluted with carbonated or un-carbonated (i.e., still) water to produce such ready-to-drink beverages. Certain embodiments, for example, include rebaudioside M as an additional sweetener (i.e., contain rebaudioside M in a concentration sufficient to add perceptible sweetness to the beverage product), either alone or in combination with one or more other rebaudiosides. Rebaudioside M is a potent sweetener that can be produced by extraction from *Stevia rebaudiana* plant leaves followed by purification to obtain either pure rebaudioside M or to increase the concentration of rebaudioside M relative to other components of the extract. It also can be produced enzymatically or synthetically. A leading text on stevia and steviol glycoside sweeteners, "*Stevia*, The genus *Stevia*", edited by A. Douglas Kinghorn (2002), does not recognize or mention the existence of rebaudioside M. The molecular formula of rebaudioside M is $C_{56}H_{90}O_{33}$ and the molecular weight is 1291.3. It has CAS No. 1220616-44-3 and its appearance in a pure form (e.g., 98 wt. percent or more pure) is that of a white powder. It can be obtained from Jin Tan Natural Product MFR Co. Ltd. (City of Industry, California). It is listed in US Patent Application Publication No. 2011/0183056 of Morita et al. (U.S. patent application Ser. No. 13/122,232) where it is said to have the structure:

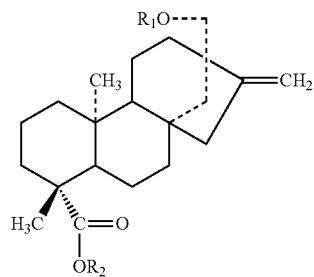

where moiety $R_1$ and moiety $R_2$ each has the structure:

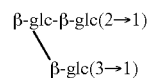

Given the benefit of this disclosure and techniques known in the art, it will be within the ability of one of skill in the art to purify a *Stevia rebaudiana* extract to selectively isolate one or more of the rebaudiosides or other steviol glycoside components of the extract for use in a comestible embodiment of the present disclosure, including, e.g., rebaudioside M, or to increase the weight percentage of the particular rebaudioside(s) in the extract for such use. For example, column chromatography may be used to isolate rebaudioside M from the other steviol glycosides in a raw extract. Following chromatographic separation, rebaudioside M and/or other component(s) optionally may be recrystallized at least once or multiple times to obtain a stevia extract comprising a desired level of purity. In certain embodiments of the invention, a purified stevia extract used as the optional additional sweetening component (alone or with other rebaudiosides and/or other sweetening ingredients) has a purity of 93% or greater rebaudioside M, or at least 94%, or at least 95%, or at least 96%, or at least 97%, or at least 98%, or at least 99% by weight. In certain exemplary embodiments the rebaudioside M sweetener is obtained by purification of an extract from a cultivar of stevia having a naturally higher content of rebaudioside M. Similarly, in certain exemplary embodiments a rebaudioside A sweetener is obtained by purification of an extract from a cultivar of stevia having a naturally higher content of rebaudioside A. Similarly, in certain exemplary embodiments a rebaudioside D sweetener is obtained by purification of an extract from a cultivar of stevia having a naturally higher content of rebaudioside D. Rebaudioside D is commercially available, e.g., from PureCircle Ltd.

Processes for the preparation of certain rebaudiosides, including, e.g., rebaudioside D and also rebaudioside M and others, is shown in Chinese patent application No. 201110408176.7 filed Dec. 9, 2011 by Su Zhou Jing Hong Biotech Co., Ltd. (Wujiang, Jiangsu Province, People's Republic Of China) and corresponding U.S. provisional patent application No. 61/579,016 filed Dec. 22, 2011, the entire contents of which are hereby incorporated by reference herein. In accordance with various alternative embodiments of the beverages and other food products disclosed here, a sweetening amount of any one of the rebaudiosides shown in the aforesaid patent documents may optionally be used with rebaudioside M, e.g., any combination of two or more of them with or without other sweeteners.

Rebaudioside M has now been found to have a sweetness intensity significantly higher than rebaudioside A in at least certain of the compositions of the present disclosure comprising D-psicose and erythritol as described above. Rebaudioside M has also been found to provide comestibles disclosed here, including, e.g. beverages and food other products comprising D-psicose and erythritol, with a desirable sweet taste profile. Certain embodiments of the comestibles disclosed here comprising D-psicose and erythritol sweeteners include an additional sweetener component consisting of (or consisting essentially of) rebaudioside M as the only additional sweetener. Certain such beverage product embodiments having an additional sweetener component consisting of (or consisting essentially of) rebaudioside M, which are ready-to-drink beverages for example, have up to 0.06 wt. % (e.g., 0.03 wt. % to 0.05 wt. %) rebaudioside M. Syrups for producing such beverage product embodiments by dilution with water, e.g., syrup suitable to produce RTD diet CSDs by dilution with carbonated water in a 1-plus-5 throw, have correspondingly higher concentrations of such rebaudiosides. In certain exemplary embodiments, ready-to-drink beverage products (e.g., cola beverage products) are provided comprising water and rebaudioside M as disclosed here, where rebaudioside M is present in the beverage in an amount (i.e., a concentration) of from 50 ppm to 600 ppm.

For example, certain diet cola beverage product embodiments, e.g., ready-to-drink diet cola CSDs and syrups for producing such diet cola CSDs, comprising D-psicose and erythritol as described above, further comprise an additional sweetener component comprising or consisting of (or consisting essentially of) rebaudioside M or the combination of rebaudioside M with one or more other rebaudiosides, for example, any one or more of the sweetening rebaudiosides shown in US Patent Application Publication No. 2011/0183056 of Morita et al. Certain such diet cola beverage product embodiments, for example, further comprise an additional sweetener component comprising or consisting of (or consisting essentially of) rebaudioside M with rebaudioside A and rebaudioside D. Such diet cola beverage product embodiments can be formulated to have excellent taste profiles close to that of traditional cola CSDs that are sweetened with nutritive sweeteners, such as sugar or HFCS. This is advantageous because, despite GRAS approval of rebaudioside A by the FDA in 2008 and the good commercial availability of rebaudioside A and its use in a variety of different commercially sold beverage types, the beverage industry has failed to develop and market a sufficiently good tasting diet carbonated soft drink. Significant problems have faced diet CSDs sweetened with rebaudioside A. While rebaudioside A is potently sweet, it also imparts a bitter aftertaste in CSDs and some other off-tastes, including licorice taste. This exacerbates the bitter taste contributions perceived by many consumers in various CSDs from other sources, including the $CO_2$ carbonation and caffeine (if any). In addition, rebaudioside A lacks adequate up-front sweetness for many CSD formulations, such as diet cola CSDs. Diet cola CSD formulations sweetened only with rebaudioside A, for example, are found to taste overly acidic at first, followed by sweetness and then off-tastes and bitter aftertastes. This lack of up-front sweetness etc. is detrimental to the taste profile of the beverage and reduces consumer satisfaction. It has been surprisingly discovered, however, that diet CSDs and other beverage products, as well as D-psicose/erythritol compositions and other food products sweetened with rebaudioside M or with rebaudioside M together with sweetening by rebaudioside A and rebaudioside D, along with D-psicose and erythritol sweetening according to this disclosure exhibit a better taste profile than if sweetened with rebaudioside A alone.

Certain RTD diet cola beverage product embodiments and other RTD diet CSDs, that achieve the beneficial taste profile referred to above, have an additional sweetener component comprising rebaudioside A, rebaudioside D and rebaudioside M, for example, have up to 0.05 wt. % (i.e., 0.0 wt. % to 0.05 wt. %) rebaudioside A and up to 0.05 wt. % rebaudioside D, and up to 0.06 wt. % (e.g., 0.005 wt. %-0.05 wt. %) rebaudioside M. According to certain embodiments, rebaudioside M provides at least 10% of the total sweetening of a cola beverage product, e.g. a diet cola syrup, a ready-to-drink diet cola beverage, another beverage product, or another food product in accordance with the present disclosure. According to certain embodiments, rebaudioside M provides at least 20% of the total sweetening, or at least 30% of the total sweetening, or at least 40% of the total sweetening, or at least half of the total sweetening, or at least 60% of the total sweetening, or at least 70% of the total sweetening, or at least 80% of the total sweetening, or at least 90% of the total sweetening. As used herein, the term "total sweetening of the beverage product" includes the sweetness of the beverage product contributed by any and all sweetening ingredients. A "sweetening ingredient" as that term is used here, is one that is itself sweet and which itself contributes sweetness in the beverage product perceptible to a sensory panel (as described above). Accordingly, as used here, the percent of total sweetening contributed by a particular sweetener ingredient in a particular beverage or other food is determined based on the concentration and potency of that particular sweetener and the cumulative total corresponding value of all of the sweetening ingredients in the beverage or other food in question, ignoring any synergism that may occur between or among the sweeteners in the particular beverage or other food and ignoring the effect of any sweetness enhancer with the like that may be included in the particular formulation. Thus, the concentration times the potency of a particular sweetener is the numerator and the cumulative total of that value (concentration times potency) for all of the sweetener ingredients in the formulation is the denominator. The resulting value, expressed as a percentage, is the percent or percentage of total sweetening provided by the particular sweetener in question in the particular beverage or other food in question.

In certain embodiments of the beverage products and other food products disclosed here, rebaudioside M sweetener is used together with a combination of rebaudiosides (optionally referred to as soluble rebaudioside D or soluble Reb D) comprising about 70 wt. % rebaudioside D and 30 wt. % rebaudioside A, perhaps with traces of other steviol glycosides or other compounds. Soluble Reb D is commercially available from Pure Circle Limited. It has been found that rebaudioside M in combination with soluble Reb D in the compositions and food products disclosed here comprising a D-psicose/erythritol composition achieves cost-effective sweetening with a desirable taste profile. Surprisingly, substantial sweetening is obtained in such embodiments from the rebaudioside A component of the combination without incurring the unwanted lingering or bitter aftertaste typically associated with the use of rebaudioside A sweetener. Certain RTD diet cola beverage embodiments, for example, have a pH between 3.0 and 3.5 may include 0.01 wt. %-0.03 wt. % rebaudioside A, and 0.01 wt. %-0.03 wt. % rebaudioside D, and 0.02 wt. %-0.06 wt. % of rebaudioside M. Syrup for such RTD diet cola beverage embodiments have a correspondingly higher concentration. A syrup for such RTD diet colas suitable for a 1-plus-5 throw dilution with carbonated water, may include concentrations of the sweeteners six times higher than those recited above for the ready-to-drink beverage embodiments. Such diet cola products are found to have a desirable sweet taste profile, including good up-front sweetness and substantially less bitter aftertaste than the same diet cola formulations equally sweetened with Reb A alone. In certain RTD diet cola CSD beverage embodiments having the additional sweetener component with rebaudioside A, rebaudioside D and rebaudioside M, D-psicose is present in an amount of 0.5 wt. % to 2.1 wt. % of the beverage, erythritol is present in an amount of 0.5 wt. % to 3.5 wt. %, rebaudioside A is present in an amount of 0.01 wt. % to 0.05 wt. %, rebaudioside D is present in an amount of 0.01 wt. % to 0.05 wt. %, and rebaudioside M is present in an amount of 0.02 wt. % to 0.06 wt. %.

As noted above, certain embodiments of the comestibles disclosed here are dry foods, such as, e.g., ready-to-eat cereals, snack bars, chips and other foods containing one or more grain constituents, or are gels, etc. As used herein, the term "grain constituent" is intended to include any component of a whole grain, e.g., the whole grain kernel, the germ, the bran, the endosperm and any combination thereof. Whole grains typically refer to the germ, bran and endosperm of a grain, and may be milled, un-milled, etc. Refined grains typically refer to grain products in which the bran and most or all of the germ have been removed, leaving primarily or only the endosperm. A "grain constituent" may be, e.g., any combination of one or more components of a grain that have been ground into flour, cut into pieces of a variety of sizes or used whole. As used herein, the term "ready-to-eat cereal" refers to a grain product that may be eaten without the need for further preparation other than the optional addition of a liquid such as, for example, milk, a milk substitute, juice, or the like. As used herein, the term "snack" includes grain products that can be consumed from the packaging or container, optionally without further preparation. Snack grain products include, for example, snack bars such as, for example, grain bars, breakfast bars, granola bars (e.g., crunchy and/or soft), nutrition bars, diet bars and the like. The ready-to-eat grain products and/or snack grain products described herein can be fashioned into a variety of physical forms, such as, e.g., puffs, flakes, shreds, clusters, sheets and any combination thereof.

The beverage products disclosed here include, for example, ready-to-drink liquid formulations, beverage concentrates or syrups, and the like. As used here, the term "ready-to-drink" refers to a beverage that can be ingested or consumed as-is. That is, the ready-to-drink beverage requires no dilution or additions prior to ingestion by a consumer. Ready-to-drink beverage products of the invention include, e.g., carbonated and non-carbonated soft drinks, fountain beverages, carbonated and non-carbonated frozen ready-to-drink beverages, coffee beverages, tea beverages, dairy beverages, powdered soft drinks, as well as liquid concentrates, flavored waters, enhanced waters, fruit juice and fruit juice-flavored drinks, sport drinks, and alcoholic products. Ready-to-drink diet or low calorie, frozen beverages in accordance with one aspect of this disclosure can be prepared directly or from a concentrate syrup. Optionally the formulation may include flavoring, a sweetener component having one or more sweeteners, preservative and/or other suitable ingredients.

To prepare at least certain diet or low calorie frozen beverage embodiments from a concentrate syrup, previously made syrup can be diluted with water, e.g. in a 1-plus-5 throw, to produce a beverage mixture. The beverage mixture can be poured into the hopper of a frozen beverage unit (e.g. a Taylor 428 or 430 frozen beverage unit or an Ultra I or Ultra II frozen beverage unit) to generate and dispense frozen beverage. Alternatively, the water and syrup can be combined at the point of dispensing. Optionally the frozen beverage can be flavored after being dispensed by adding flavored syrup. Frozen carbonated beverage embodiments in accordance with one aspect of the present disclosure, for example, low calorie embodiments and diet embodiments, can be prepared directly as ready-to-drink beverages or as syrup to be held in a frozen carbonated beverage machine (optionally referred to here as an "FCB Dispenser") configured to hold the syrup at reduced temperature and to add carbonated water to the syrup and dispense ready-to-drink frozen carbonated beverage at the time of consumption. Suitable FCB Dispensers are known to those skilled in the art and include, for example, the Cornelius V3 model and newer versions available from IMI Cornelius, Inc., a subsidiary of IMI plc. For example, beverage syrup for frozen carbonated beverages can be prepared by combining the ingredients of a CSD flavor base other ingredients. For example, erythritol (e.g., up to 3.5% by weight of finished beverage) and D-Psicose (e.g., up to 2.1% by weight of finished beverage) can be added to a sweetened or unsweetened CSD base containing water, flavoring, preservative, etc. (e.g., cola CSD base or lemon-lime CSD base) or other beverage base with stirring to achieve some or complete dissolution. Sweetener component, e.g., rebaudioside M (e.g., 100 ppm to 600 ppm of finished beverage) with or without other sweeteners, e.g., soluble Reb D, can be added at any suitable point, e.g., prior to or after adding the other ingredients mentioned above, with stirring for partial or complete dissolution. Other ingredients suitable to the desired characteristics of the finished beverage can be added, such as any of those discussed elsewhere in this disclosure. The syrup can be placed into a frozen carbonated beverage machine ("FCB Dispenser") configured to add carbonated water to the syrup before or at the time of dispensing servings of finished ready-to-drink diet frozen carbonated beverage. Ready-to-drink servings of finished frozen carbonated beverage should have good carbon dioxide overrun, smooth, creamy mouthfeel and good taste profile. Optionally frozen carbonated beverage syrup can be successively run through the FCB Dispenser to achieve consistently high quality ready-to-drink servings of finished frozen carbonated beverage.

A "sweetener," as noted above (and alternative terms such as "sweetening ingredient") is one that contributes sweetness to the fully formulated comestible product that is perceptible to the sensory test panel. Thus, as used here, a sweetening ingredient, such as a sweetener included in the optional additional sweetening component included in the formulation, e.g., one or more rebaudiosides, is "present in a sweetening amount" if it is present in an amount sufficient to contribute sweetness perceptible to a sensory test panel. That is, as used here that term (and any alternative similar term, such as "sweetening amount of") means an amount or concentration that in the comestible formulation in question causes sweetening perceptible to the sensory test panel. In the case of a concentrate to be diluted for producing a ready-to-eat comestible, a sweetening amount in the concentrate is an amount that yields sweetening in the ready-to-eat product that is perceptible to the sensory test panel. For example, in the case of a syrup for producing a ready-to-drink beverage (e.g., by dilution with carbonated water to produce a ready-to-drink carbonated CSD), a sweetening amount of any ingredient in the syrup is an amount or concentration in the syrup that yields perceptible sweetening of the ready-to-drink beverage. Such panels in the present context should comprise 8 to 12 individuals trained to evaluate sweetness perception and measure sweetness at several time points from when a sample is initially taken into the mouth until 3 minutes after it has been expectorated. For accuracy, each assessor may repeat the testing of each sample, e.g., twice or more times, e.g., from three to about five times per sample, with rinsing and a rest period (e.g., five minutes) between each repetition and a rest period between each new and previous sample. Results may be determined using statistical analysis for comparing (i) test sample results for each particular formulation with the ingredient in question to (ii) control test samples of the same formulation but without the ingredient in question. If some sweetness was detected in the samples without the ingredient in question, then the perceptible sweetening may occur as a detected increase in sweetness in the test sample(s) containing the ingredient in question, e.g., at a point in time when it was not detected in the control sample(s). The panel of assessors may be trained using procedures well known to those of ordinary skill in the art, e.g., using the Spectrum™ Descriptive Analysis Method (Meilgaard et al, Sensory Evaluation Techniques, 3rd edition, Chapter 11).

It should be understood that D-psicose/erythritol compositions and beverages and other food products in accordance with this disclosure may have any of numerous different specific formulations or constitutions. The formulation may vary depending upon such factors as the product's intended market segment, its desired nutritional characteristics, flavor profile and the like. Certain embodiments of the invention, in addition to comprising D-psicose and erythritol as sweeteners, as described above, further comprise one or more other suitable ingredients, for example, any one or more preservatives, taste modifiers or maskers, flavoring agents, solvents, stabilizers, bulking agents, clouding agents, vitamins, minerals, electrolytes, anti-caking agents, constituents conveniently or unavoidably included in an extract used in the formulation (e.g., an extract used as a flavorant, sweetener, such as a *Stevia* extract, etc. in the formulation) or a combination of any of these and/or other ingredients suitable for consumption. The bulking agent may be, e.g., maltodextrin, polydextrose, a dextrin, inulin, an oligosaccharide, beta-glucan, a resistant starch, a hydrocolloid and a corn syrup solid. The hydrocolloid may be: for example, gum Arabic, pectin, guar gum, alginate, carrageenan, xanthan gum, cellulose gum or a combination of two or more of any of them. Additional and alternative suitable ingredients will be recognized by those skilled in the art given the benefit of this disclosure. In the case of beverage product embodiments, for example, optionally the beverage product further comprises water and any one or more ingredients known for use in beverages, such as acidulants, fruit juices and/or vegetable juices, pulp, flavorings, colorants, preservative, vitamins, minerals, electrolytes, D-tagatose, glycerine, and carbon dioxide. According to certain exemplary embodiments, the beverage product is a ready-to-drink beverage, such as a diet beverage product or reduced calorie beverage product, for example a ready-to-drink beverage packaged in a single serving container. According to certain other exemplary embodiments, the beverage product is a beverage concentrate, that is, a syrup to be diluted to form a ready-to-drink beverage.

The terms "beverage concentrate," "throw beverage syrup" and "syrup" are used interchangeably throughout this disclosure. At least certain embodiments of the beverage concentrates disclosed here are prepared with an initial volume of water to which the additional ingredients are added. A single strength beverage composition (i.e., a beverage composition at a concentration that is ready-to-drink) may be formed from the beverage concentrate or syrup by adding further volumes of water to the concentrate to dilute it to a single strength. Typically, for example, single strength beverages, including for example diet cola beverage products, may be prepared from the concentrates by combining approximately 1 part concentrate with 3 to 7 parts water or more. For example, some so called super fountain syrup embodiments in accordance with the present disclosure may be formulated to be diluted with as much as 32 parts carbonated water. In certain exemplary embodiments a single strength beverage is prepared by combining 1 part concentrate with 5 parts water. In certain other embodiments, a single strength beverage is directly prepared without the formation of a concentrate and subsequent dilution.

Certain embodiments of the comestibles disclosed here are natural in that they do not contain anything artificial or synthetic, including, in some cases, no color additives regardless of source. As used herein, for example, a "natural" beverage composition is defined in accordance with the following guidelines: Raw materials for a natural ingredient exists or originates in nature. Biological synthesis involving fermentation and enzymes can be employed, but synthesis with chemical reagents is not utilized. Artificial colors, preservatives, and flavors are not considered natural ingredients. Ingredients may be processed or purified through certain specified techniques including at least: physical processes, fermentation, and enzymolysis. Appropriate processes and purification techniques include at least: absorption, adsorption, agglomeration, centrifugation, chopping, cooking (baking, frying, boiling, roasting), cooling, cutting, chromatography, coating, crystallization, digestion, drying (spray, freeze drying, vacuum), evaporation, distillation, electrophoresis, emulsification, encapsulation, extraction, extrusion, filtration, fermentation, grinding, infusion, maceration, microbiological (rennet, enzymes), mixing, peeling, percolation, refrigeration/freezing, squeezing, steeping, washing, heating, mixing, ion exchange, lyophilization, osmose, precipitation, salting out, sublimation, ultrasonic treatment, concentration, flocculation, homogenization, reconstitution, and enzymolysis (using enzymes found in nature). Processing aids (currently defined as substances used as manufacturing aids to enhance the appeal or utility of a food component), including clarifying agents, catalysts, flocculants, filter aids, and crystallization inhibitors, etc.) are considered incidental additives and may be used in the preparation of a natural beverage or other natural comestible if removed appropriately. See 21 CFR § 170.3(o)(24). Substantially clear embodiments of the beverage products disclosed here are substantially clear in that the beverages have substantially no turbidity and substantially no color.

Water is a basic ingredient in the products disclosed here, including for example cola beverage products, typically being the vehicle or primary liquid portion in which the Rebaudioside M is provided and the remaining ingredients in the beverage products are dissolved, emulsified, suspended or dispersed. Purified water can be used in the manufacture of certain embodiments of the beverage products disclosed here, and water of a standard beverage quality can be employed in order not to adversely affect beverage taste, odor, or appearance. The water typically will be clear, colorless, free from objectionable minerals, tastes and odors, free from organic matter, low in alkalinity and of acceptable microbiological quality based on industry and government standards applicable at the time of producing the beverage. In certain typical embodiments of beverage products, water is present at a level of from about 80% to about 99.9% by weight of the beverage. In at least certain exemplary embodiments the water used in beverages and concentrates disclosed here is "treated water," which refers to water that has been treated to reduce the total dissolved solids of the water prior to optional supplementation, e.g., with calcium as disclosed in U.S. Pat. No. 7,052,725. Methods of producing treated water are known to those of ordinary skill in the art and include deionization, distillation, filtration and reverse osmosis ("r-o"), among others. The terms "treated water," "purified water," "demineralized water," "distilled water," and "r-o water" are understood to be generally synonymous in this discussion, referring to water from which substantially all mineral content has been removed, typically containing no more than about 500 ppm total dissolved solids, e.g. 250 ppm total dissolved solids.

As used herein, a "full-calorie" beverage formulation is one fully sweetened with a nutritive sweetener. The term "nutritive sweetener" refers generally to sweeteners which provide significant caloric content in typical usage amounts, e.g., more than about 5 calories per 8 oz. serving of beverage. As used herein, a "potent sweetener" means a sweetener which is at least twice as sweet as sugar, that is, a sweetener which on a weight basis requires no more than half the weight of sugar to achieve an equivalent sweetness. For example, a potent sweetener may require less than one-half the weight of sugar to achieve an equivalent sweetness in a beverage sweetened to a level of 10 degrees Brix with sugar. For natural beverage products and other natural comestibles disclosed here, only natural potent sweeteners are employed. It should also be recognized that in certain formulations certain sweeteners will act as tastents, masking agents or the like, e.g., when used in amounts below its sweetness perception threshold in the formulation in question. As used herein, a "non-nutritive sweetener" is one which does not provide significant caloric content in typical usage amounts, i.e., is one which imparts fewer than 5 calories per 8 oz. serving of beverage to achieve the sweetness equivalent of 10 Brix of sugar. As used herein, "reduced calorie beverage" means a beverage having at least a 25% reduction in calories per 8 oz. serving of beverage as compared to the full calorie version, typically a previously commercialized full-calorie version. In at least certain embodiments, a reduced calorie beverage has about a 50% reduction in calories per 8 oz. serving as compared to the full calorie version. As used herein, a "low-calorie beverage" has fewer than 40 calories per 8 oz. serving of beverage. As used herein, "zero-calorie" or "diet" means having less than 5 calories per serving, e.g., per 8 oz. for beverages.

An acidulant comprising at least one edible acid is used in certain embodiments of the comestibles disclosed here. For example, in certain beverage products disclosed here, e.g., cola beverages, and acidulant may serve any one or more of several functions, such as lending tartness to the taste of the beverage, enhancing palatability, increasing thirst quenching effect, modifying sweetness and acting as a preservative. As used herein, the term "low pH" refers to an acidic pH below pH 6, such as in the range of about 1 to about 6. Certain exemplary embodiments of the beverages disclosed here (e.g., ready-to-drink diet cola beverage products) have a pH in the range of about 2.0 to 5.0, or in the range of about 2.5 to 4.0, or in the range of about 2.8 to 3.3 or in the range of about 3.0 to 3.2. The pH of at least certain exemplary embodiments of the beverages disclosed here may have a value within the range of from about 2.0 to 5.0, about 2.5 to 4.0, about 2.8 to 3.3 or about 3.0 to 3.2., e.g., 3.1. The acid in certain exemplary embodiments enhances beverage flavor. Too much acid may impair the beverage flavor and result in tartness or other off-taste, while too little acid may make the beverage taste flat. As used herein, the term "high pH" refers to a basic pH in the range of about 8 to about 14. As used herein, the term "neutral pH" refers to a pH of about 7 (e.g., from about 6.0 to 8.0, or in the range of about 6.5 to about 7.5). Certain exemplary embodiments of the beverages disclosed here have a high pH, e.g., a pH in the range of about pH 8 to 14. Certain exemplary embodiments of the beverage products disclosed here have a neutral pH, e.g., a pH in the range of about pH 6 to pH 8, or in the range of about pH 6.5 to 7.5.

The particular acid or acids chosen and the amount used will depend, in part, on the other ingredients, the desired shelf life of the formulation, as well as desired effects on pH, titratable acidity, and taste. In the case of certain beverage product embodiments in accordance with the present disclosure, for example, the one or more acids of the acidulant may be used in an amount, collectively, of from about 0.01% to about 1.0% by weight of the beverage, e.g., from about 0.01% to about 0.5% by weight, from about 0.05% to about 0.5% by weight, from about 0.05% to about 0.25% by weight, from about 0.1% to about 0.25% by weight, depending upon the acidulant used, desired pH, other ingredients used, etc., of the beverage product (e.g., a cola beverage product). Suitable acids are known and will be apparent to those skilled in the art given the benefit of this disclosure. Exemplary acids suitable for use in some or all embodiments of the beverage products disclosed here include phosphoric acid, citric acid, malic acid, tartaric acid, lactic acid, fumaric acid, ascorbic acid, gluconic acid, succinic acid, maleic acid, adipic acid, cinnamic acid, glutaric acid, and mixtures of any of them. Typically, the acid is phosphoric acid, citric acid, malic acid, or combinations of any of them, such as, e.g., phosphoric acid and citric acid. In embodiments comprising natural beverage products (e.g., natural cola beverage products), the acid can be selected, e.g., from the group consisting of citric acid, malic acid, tartaric acid, formic acid, gluconic acid, lactic acid, fumaric acid, adipic acid, succinic acid, maleic acid, cinnamic acid, glutaric acid, and mixtures of any of them. For instance, in certain embodiments the acid comprises or consists essentially of lactic acid, tartaric acid and citric acid, and in certain embodiments the acid comprises or consists essentially of lactic acid and at least one of tartaric and citric acids.

Titratable acidity is an indication of the total acidity of a beverage product. Titratable acidity measures the amount of alkali required to neutralize the acid of a given volume of beverage. The titratable acidity can be measured as the milliliters of 0.1 N NaOH required to titrate 100 ml of beverage to a pH 8.75 end point with a potentiometer. The titratable acidity of certain embodiments of beverage products disclosed here (e.g., diet cola beverage products) is typically about 8.75 to about 12.5, or from about 9 to about 11. Suitable titratable acidities include, e.g., about 9, 9.25, 9.5, 9.75, 10, 10.25, or 10.9.

Those skilled in the art, given the benefit of this disclosure, will recognize that the pH/stability of beverage products, such as, e.g., ready-to-drink diet cola beverage product embodiments of the present disclosure, comprising D-psicose and erythritol as described above and further containing an additional sweetening component including peptide-based artificial sweeteners, such as aspartame, follows a bell curve, with pH about 4.2 generally providing the best stability for retaining the sweetening effect of the artificial sweetener. In the formation of calcium-supplemented beverage embodiments in accordance with the present disclosure, the presence of calcium salt(s) may require additional acids to both assist the dissolution of the salt and maintain a desirable pH for stability of an artificial sweetener. The presence of the additional acid in the beverage composition, which increases the titratable acidity of the composition, will result in a more tart or sour taste. It will be within the ability of those skilled in the art, given the benefit of this disclosure, to select a suitable acid or combination of acids and the amounts of such acids for the acidulant component of any particular embodiment of the beverage products disclosed here.

Certain exemplary embodiments of the comestibles disclosed here, including, for example, cola beverage products, also may contain small amounts of alkaline agents, e.g., to adjust pH or for other purposes. Such agents include, e.g., potassium citrate and sodium citrate. For example, the alkaline agent potassium hydroxide may be used in an amount of from about 0.005 wt. % to about 0.02 wt. % (by weight of the beverage), with an amount of about 0.01% being typical for certain beverages. The amount will depend, of course, on the type of alkaline agents and on the degree to which the pH is to be adjusted.

The comestibles disclosed here optionally contain a flavor component or flavorant, which may be a single flavor ingredient or a multi-ingredient flavor composition. For example, in certain embodiments, the flavor component may comprise, or consist of (or consist essentially of) one or a combination of two or more natural and/or synthetic fruit flavors, botanical flavors, spice flavors, other flavors, and mixtures of any of them. The flavor component may further comprise a blend of several of the above-mentioned flavors. The particular amount of the flavor component useful for imparting flavor characteristics to the beverage products of the present invention will depend upon the flavor(s) selected, the flavor impression desired, and the form of the flavor component. Those skilled in the art, given the benefit of this disclosure, will be readily able to determine the amount of any particular flavor component(s) used to achieve the desired flavor impression.

As used here, the term "fruit flavor" refers generally to those flavors derived from the edible reproductive part of a seed plant. Included are both those wherein a sweet pulp is associated with the seed, e.g., banana, tomato, cranberry and the like, and those having a small, fleshy berry. Exemplary fruit flavors include the citrus flavors, e.g., orange, lemon, lime grapefruit, tangerine, mandarin orange, tangelo, and pomelo, and such flavors as apple, grape, cherry, and pineapple flavors and the like, and mixtures thereof. The term berry also is used here to include aggregate fruits, i.e., not "true" berries, but fruit commonly accepted as such. Also included within the term "fruit flavor" are synthetically prepared flavors made to simulate fruit flavors derived from natural sources. Examples of suitable fruit or berry sources include whole berries or portions thereof, berry juice, berry juice concentrates, berry purees and blends thereof, dried berry powders, dried berry juice powders, and the like. In certain exemplary embodiments the comestible, e.g. beverage concentrate or other beverage product, comprises a fruit flavor component, e.g., a juice concentrate or juice. Juices suitable for use in at least certain exemplary embodiments of the comestibles disclosed here, including, e.g., beverage products, including for example diet cola beverage products, include, e.g., fruit, vegetable and berry juices. Juices may be employed in the present invention in the form of a concentrate, puree, single-strength juice, or other suitable forms. The term "juice" as used here includes single-strength fruit, berry, or vegetable juice, as well as concentrates, purees, milks, and other forms. Certain such juices which are lighter in color may be included in the formulation of certain exemplary embodiments to adjust the flavor and/or increase the juice content of the beverage without darkening the beverage color. Examples of such juices include apple, pear, pineapple, peach, lemon, lime, orange, apricot, grapefruit, tangerine, rhubarb, cassis, quince, passion fruit, papaya, mango, guava, litchi, kiwi, mandarin, coconut, and banana. Deflavored and decolored juices may be employed if desired. Multiple different fruit, vegetable and/or berry juices may be combined, optionally along with other flavorings, to generate a beverage having the desired flavor. Examples of suitable juice sources include plum, prune, date, currant, fig, grape, raisin, cranberry, pineapple, peach, banana, apple, pear, guava, apricot, Saskatoon berry, blueberry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, sloe, rowan, gooseberry, cashew apple, pomegranate, persimmon, mango, rhubarb, papaya, litchi, lemon, orange, lime, tangerine, mandarin and grapefruit etc. Numerous additional and alternative juices suitable for use in at least certain exemplary embodiments will be apparent to those skilled in the art given the benefit of this disclosure. In the beverages of the present invention employing juice, juice may be used, for example, at a level of at least about 0.2% by weight of the beverage. In certain exemplary embodiments juice is employed at a level of from about 0.2% to about 40% by weight of the beverage. Typically, juice may be used, if at all, in an amount of from about 1% to about 20% by weight.

As used here, the term "botanical flavor" refers to flavors derived from parts of a plant other than the fruit. As such, botanical flavors may include those flavors derived from essential oils and extracts of nuts, bark, roots and leaves. Also included within the term "botanical flavor" are synthetically prepared flavors made to simulate botanical flavors derived from natural sources. Examples of such flavors include cola flavors, tea flavors, and the like, and mixtures thereof.

Other flavorings suitable for use in at least certain exemplary embodiments of the beverage products disclosed here include, e.g., spice flavorings, such as cassia, clove, cinnamon, pepper, ginger, vanilla spice flavorings, cardamom, coriander, root beer, sassafras, ginseng, and others. Numerous additional and alternative flavorings suitable for use in at least certain exemplary embodiments will be apparent to those skilled in the art given the benefit of this disclosure. Flavorings may be in the form of an extract, oleoresin, juice concentrate, bottler's base, or other forms known in the art. In at least certain exemplary embodiments, such spice or other flavors complement that of a juice or juice combination.

In certain embodiments of the comestibles disclosed here, one or more components of a flavor composition included in the formulation may be used in the form of an emulsion. A flavoring emulsion may be prepared by mixing some or all of the flavorings together, optionally together with other ingredients of the beverage, and an emulsifying agent. The emulsifying agent may be added with or after the flavorings mixed together. In certain exemplary embodiments the emulsifying agent is water-soluble. Exemplary suitable emulsifying agents include gum acacia, modified starch, carboxymethylcellulose, gum tragacanth, gum ghatti and other suitable gums. Additional suitable emulsifying agents will be apparent to those skilled in the art of beverage formulations, given the benefit of this disclosure. The emulsifier in exemplary embodiments comprises greater than about 3% of the mixture of flavorings and emulsifier. In certain exemplary embodiments the emulsifier is from about 5% to about 30% of the mixture.

Carbon dioxide is used to provide effervescence to certain exemplary embodiments of the beverages disclosed here, including, for example, ready-to-drink diet cola beverages. Any of the techniques and carbonating equipment known in the art for carbonating beverages may be employed. Carbon dioxide may enhance the beverage taste and appearance and may aid in safeguarding the beverage purity by inhibiting and destroying objectionable bacteria. In certain embodiments, for example, the beverage has a $CO_2$ level up to about 4.0 volumes carbon dioxide. Typical embodiments may have, for example, from about 0.5 to 5.0 volumes of carbon dioxide. As used here and independent claims, one volume of carbon dioxide is defined as the amount of carbon dioxide absorbed by any given quantity of liquid, e.g., water at 60° F. (16° C.) and one atmospheric pressure. A volume of gas occupies the same space as does the liquid by which it is dissolved. The carbon dioxide content may be selected by those skilled in the art based on the desired level of effervescence and the impact of the carbon dioxide on the taste or mouthfeel of the beverage. The carbonation may be natural or synthetic.

Optionally, caffeine may be added to various embodiments of the beverage products, and other comestibles disclosed here, including for example diet cola beverage products. The amount of caffeine added is determined by the desired beverage properties, any applicable regulatory provisions of the country where the beverage is to be marketed, etc. In certain exemplary embodiments caffeine is included at a level of 0.02 percent or less by weight of the beverage. The caffeine must be of purity acceptable for use in foods and beverages. The caffeine may be natural or synthetic in origin.

The beverage concentrates and other beverage product embodiments of the present disclosure, including for example cola beverage products, may contain additional ingredients compatible with D-psicose and erythritol, including, generally, any of those typically found in comestible formulations. Examples of such additional ingredients include, but are not limited to, caramel and other coloring agents or dyes, antifoaming agents, gums, emulsifiers, tea solids, cloud components, and mineral and non-mineral nutritional supplements. Examples of non-mineral nutritional supplement ingredients are known to those of ordinary skill in the art and include, for example, antioxidants and vitamins, including Vitamins A, D, E (tocopherol), C (ascorbic acid), B (thiamine), $B_2$ (riboflavin), $B_6$, $B_{12}$, and K, niacin, folic acid, biotin, and combinations of any of them. The optional non-mineral nutritional supplements are typically present in amounts generally accepted under good manufacturing practices. Exemplary amounts are between about 1% and about 100% RDV (recommended daily value), where such RDV are established. In certain exemplary embodiments the non-mineral nutritional supplement ingredient(s) are present in an amount of from about 5% to about 20% RDV, where established.

Preservatives (including single ingredient preservatives and so-called preservation systems) may be used in at least certain embodiments of the beverage products and other comestibles disclosed here. If used, it may be added to the formulation at any suitable time during production. As used here, the terms "preservation system" and "preservative" include any approved for use in food and beverage compositions, including, e.g., benzoates, e.g., sodium, calcium, and potassium benzoate, sorbates, e.g., sodium, calcium, and potassium sorbate, citrates, e.g., sodium citrate and potassium citrate, polyphosphates, e.g., sodium hexametaphosphate (SHMP), and mixtures thereof, and antioxidants such as ascorbic acid, EDTA, BHA, BHT, TBHQ, dehydroacetic acid, dimethyldicarbonate, ethoxyquin, heptylparaben, and combinations of any of them. Preservatives may be used in amounts not exceeding mandated maximum levels under applicable laws and regulations typically about 0.05% by weight. The level of preservative used typically is adjusted according to the particular formulation, including the planned final product pH and the microbiological spoilage potential of the formulation. It will be within the ability of those skilled in the art, given the benefit of this disclosure, to select a suitable preservative or combination of preservatives for beverages according to this disclosure.

Other methods of preservation suitable for at least certain exemplary embodiments include, e.g., aseptic packaging and/or heat treatment or thermal processing steps, such as hot filling and tunnel pasteurization. Such steps can be used to reduce yeast, mold and microbial growth in the product.

For example, U.S. Pat. No. 4,830,862 to Braun et al. discloses the use of pasteurization in the production of fruit juice beverages as well as the use of suitable preservatives in carbonated beverages. U.S. Pat. No. 4,925,686 to Kastin discloses a heat-pasteurized freezable fruit juice composition which contains sodium benzoate and potassium sorbate. In general, heat treatment includes hot fill methods typically using high temperatures for a short time, e.g., about 190° F. for 10 seconds, tunnel pasteurization methods typically using lower temperatures for a longer time, e.g., about 160° F. for 10-15 minutes, and retort methods typically using, e.g., about 250° F. for 3-5 minutes at elevated pressure, i.e., at pressure above 1 atmosphere.

EXAMPLES

Example 1. Quantitative descriptive evaluation of samples of ready-to-drink diet cola embodiments of the beverages disclosed here and of comparative control beverage samples were conducted by panels of ten trained taste test panelists, with two evaluations by each panelist for each beverage sample. Scoring was on a 0 to 15 scale, 15 being the highest or fastest. As further explained below, the tests revealed that the diet cola beverage formulation sweetened with D-psicose and erythritol in accordance with one embodiment of the present disclosure had directionally more sweetness initial flavor, quicker sweetness on-set, more cola and citrus flavors, less sour flavor, and a more "regular" overall taste impression. The taste advantage of the diet cola beverage formulation sweetened with D-psicose and erythritol was statistically significant in the "Blended" flavor attribute. This attribute is defined as the degree to which the flavors in the sample are blended together and not individually distinguishable versus being individually prominent or individually distinguishable. The following Table 1 shows the formulation of (i) the syrup for making the ready-to-drink diet cola control beverage formulation sweetened with rebaudioside A and rebaudioside D, and (ii) the syrup for making the ready-to-drink diet cola beverage formulation in accordance with the present disclosure, sweetened with D-psicose and erythritol in the amounts shown in addition to rebaudioside A and rebaudioside D. The rebaudioside A and rebaudioside D were provided as 3.0 g soluble Reb D (i.e., rebaudioside D together with rebaudioside A in 7:3 weight ratio), meaning 0.9 g rebaudioside A and 2.1 g rebaudioside D. It can be seen that the formulations are identical other than the D-psicose and erythritol sweeteners in the diet cola beverage embodiment in accordance with the present disclosure.

TABLE 1

BEVERAGE CONCENTRATE SYRUP FORMULAS

| Ingredients | Diet Cola Control Beverage | Diet Cola Beverage with D-Psicose and Erythritol |
| --- | --- | --- |
| Sodium benzoate | 2.04 g | 2.04 g |
| Phosphoric acid | 4.41 g | 4.41 g |
| Caffeine | 1.27 g | 1.27 g |
| Citric acid | 1.27 g | 1.27 g |
| Cola flavor | 38.63 g | 38.63 g |
| Rebaudioside A | 0.9 g | 0.9 g |
| Rebaudioside D | 2.1 g | 2.1 g |
| D-Psicose | 0 | 120 g |
| Erythritol | 0 | 120 g |
| Treated water | q.s. to 1 L | q.s. to 1 L |

The syrups of Table 1 were diluted with carbonated water in a 1-plus-5 throw (i.e., diluted to one-sixth the original concentration) to form the ready-to-drink diet cola beverage samples with either no D-psicose and erythritol (the comparative control samples) or 2.0 wt. % D-psicose and erythritol (the beverage embodiment in accordance with one the present disclosure). The beverage samples were tested as described above and the sensory results for important taste attributes are shown in Table 2, below. In Table 2 higher values are better for all properties other than sour flavor. As indicated by the different letter designations in Table 2 for the characteristic "Blended" (i.e., "a" for the diet cola beverage with D-psicose and erythritol and "b" for the diet cola control beverage), the value for the "Blended" characteristic for the diet cola beverage with D-psicose and erythritol is statistically significantly better than that value for the diet cola control beverage. Further, while the values for up-front sweetness (i.e., "sweetness initial flavor") are not shown to be statistically significantly different, they are shown to be directionally better for the diet cola beverage with D-psicose and erythritol.

TABLE 2

SUMMARY OF SENSORY RESULTS

| Attribute | Diet Cola Control Beverage | Diet Cola Beverage with D-Psicose and Erythritol |
| --- | --- | --- |
| sweetness initial flavor | 5.66 | 5.83 |
| speed of onset | 6.14 | 6.54 |
| cola flavor | 5.23 | 5.51 |
| citrus flavor | 2.72 | 2.93 |
| caramel flavor | 2.57 | 2.45 |
| sour flavor | 3.65 | 3.47 |
| Blended | 3.26 (b) | 4.27 (a) |
| Overall impression comparing the Sample diet cola beverage to non-diet cola beverage | 2.9 | 3.45 |

Example 2. Part A. The taste quality of rebaudioside M-sweetened formulations of diet cola beverage were improved by the addition of erythritol, D-tagatose, D-psicose or a combination of them. Samples of finished ready-to-drink cola beverage were prepared for each of six different such formulations. The formulations were ready-to-drink diet cola beverages sweetened by 500 ppm of rebaudioside M and were identical except for the low calorie, low potency sweetener ingredient bulking agents shown in Table 3, below. As seen in Table 3, each of the six variants contained erythritol, D-tagatose and/or D-psicose. The samples of each of the six variants were evaluated by five people familiar with cola beverages and cola beverage taste testing. Specifically, the samples of the six formulation variants were tasted and compared to each other and to control samples that were the same except for having no low calorie, low potency sweetener ingredient bulking agent.

TABLE 3

| Control | V-1 | V-2 | V-3 | V-4 | V-5 | V-6 |
|---|---|---|---|---|---|---|
| No erythritol | +1% Erythritol | | | +1% Erythritol | +0.5% erythritol | +1% erythritol |
| No D-tagatose | | +0.75% D-tagatose | | +0.25% D-tagatose | | |
| No D-psicose | | | +1% D-psicose | | +0.5% D-psicose | +1% D-psicose |

Example 2. Part B. The results of taste testing the samples of the six variants by five people familiar with taste testing cola beverages, including diet cola beverage taste testing. The taste testing showed that adding D-psicose and erythritol enhanced the mouthfeel of the samples relative to the other variants. The variants with D-psicose were unexpectedly found to have improved up-front sweetness. Up-front sweetness is generally lacking in beverages sweetened by steviol glycosides, and this additional advantageous effect in variant 3, variant 5 and variant 6 was an unexpected phenomenon. Variant 5 and variant 6 were judged as the best among all variants. Variant 6 was perceived as having taste close to the taste of current commercial diet colas sweetened with aspartame or other artificial sweetener, but with significantly better mouthfeel.

Example 3. Part A. Samples of finished ready-to-drink diet cola beverage were prepared for each of two formulation variants. The formulations were ready-to-drink diet cola beverages sweetened by rebaudioside M. Variant 1 had no low potency sweetener ingredients while Variant 2 did had D-psicose and erythritol, as shown in Table 4, below. Samples of both variants were evaluated by two people familiar with cola beverages and cola beverage taste testing.

TABLE 4

| Ingredients | Diet Cola Variant 1 | Diet Cola Variant 2 |
|---|---|---|
| Sodium benzoate | 2.04 g | 2.04 g |
| Phosphoric acid | 4.41 g | 4.41 g |
| Caffeine | 1.27 g | 1.27 g |
| Citric acid | 1.27 g | 1.27 g |
| Rebaudioside M | 3.6 g | 3.3 g |
| D-psicose | 0 | 30 g |
| Erythritol | 0 | 30 g |
| Treated water | q.s. to 1 L | q.s. to 1 L |

Example 3. Part B. Two people familiar with taste testing cola beverages, including diet cola beverage taste testing, tasted the samples of Variant 1 and Variant 2. Each was found to have a good sweetness taste profile and mouthfeel, while Variant 2 had a better sweetness taste profile and mouthfeel than Variant 1.

Example 4. Part A. Samples of finished ready-to-drink diet cola beverages sweetened by rebaudioside M were prepared for two formulation variants. Each of the two variants was sweetened with 1.5 g of rebaudioside M together with 2.0 g of soluble Reb D (i.e., rebaudioside D together with rebaudioside A in 7:3 weight ratio). Variant 1 had no D-psicose or erythritol while Variant 2 had D-psicose and erythritol as shown in Table 5, below. Samples of both variants were evaluated by two people familiar with taste testing cola beverages, including diet cola beverage taste testing.

TABLE 5

| Ingredients | Variant 1 Diet Cola Beverage without D-Psicose and Erythritol | Variant 2 Diet Cola Beverage with D-Psicose and Erythritol |
|---|---|---|
| Sodium benzoate | 2.04 g | 2.04 g |
| Phosphoric acid | 4.41 g | 4.41 g |
| Caffeine | 1.27 g | 1.27 g |
| Citric acid | 1.27 g | 1.27 g |
| Cola flavor | 38.63 g | 38.63 g |
| Rebaudioside A* | 0.45 g | 0.45 g |
| Rebaudioside D* | 1.05 g | 1.05 g |
| Rebaudioside M | 1.5 g | 1.5 g |
| D-Psicose | 0 | 120 g |
| Erythritol | 0 | 120 g |
| Treated water | q.s. to 1 L | q.s. to 1 L |

*Soluble Reb D

Example 4. Part B. Two people familiar with taste testing cola beverages, including diet cola beverage taste testing, tasted the samples of Variant 1 and Variant 2. Each was found to have a good sweetness taste profile and mouthfeel, while Variant 2 had a significantly better sweetness quality and mouthfeel than Variant 1.

Example 5. Part A. Samples of finished ready-to-drink diet cola beverage were prepared for each of two formulation variants. The formulations were ready-to-drink diet cola beverages sweetened by rebaudioside M. Variant 1 had no D-psicose and erythritol while Variant 2 did have D-psicose and erythritol, as shown in Table 6, below. Samples of both variants were evaluated by two people familiar with taste testing cola beverages, including diet cola beverage taste testing.

TABLE 6

| Ingredients | Diet Cola Variant 1 | Diet Cola Variant 2 |
|---|---|---|
| Sodium benzoate | 2.04 g | 2.04 g |
| Phosphoric acid | 4.41 g | 4.41 g |
| Caffeine | 1.27 g | 1.27 g |
| Citric acid | 1.27 g | 1.27 g |
| Rebaudioside M | 2.4 g | 2.4 g |
| D-psicose | 0 | 120 g |
| Erythritol | 0 | 120 g |
| Treated water | q.s. to 1 L | q.s. to 1 L |

Example 5. Part B. Six people familiar with taste testing cola beverages, including diet cola beverage taste testing, tasted the samples of Variant 1 and Variant 2. Each was found to have a good sweetness taste profile and mouthfeel, while Variant 2 had a better sweetness taste profile and mouthfeel than Variant 1.

Example 6. Part A. Samples of finished ready-to-drink diet cola beverage were prepared for each of two formulation variants. The formulations were ready-to-drink diet cola beverages sweetened by rebaudioside M. Variant 1 had no D-psicose and erythritol; Variant 2 did have D-psicose and erythritol, as shown in Table 7 below. Samples of both variants were evaluated by two people familiar with taste testing cola beverages, including diet cola beverage taste testing.

TABLE 7

| Ingredients | Diet Cola Control Beverage | Diet Cola Beverage with D-Psicose and Erythritol |
|---|---|---|
| Sodium benzoate | 2.04 g | 2.04 g |
| Phosphoric acid | 4.41 g | 4.41 g |
| Caffeine | 1.27 g | 1.27 g |
| Citric acid | 1.27 g | 1.27 g |
| Cola flavor | 38.63 g | 38.63 g |
| Rebaudioside A | 2.4 g | 2.4 g |
| D-Psicose | 0 | 126 g |
| Erythritol | 0 | 210 g |
| Treated water | q.s. to 1 L | q.s. to 1 L |

Example 6. Part B. Two people familiar with taste testing cola beverages, including diet cola beverage taste testing, tasted the samples of Variant 1 and Variant 2. Variant 2 was found to have a better sweetness taste profile and mouthfeel than Variant 1.

Example 7. Part A. Samples of finished ready-to-drink diet cola beverage were prepared for each of two formulation variants. The formulations were ready-to-drink diet cola beverages sweetened by rebaudioside M and soluble Reb D. Variant 1 had no D-psicose and erythritol; Variant 2 did have D-psicose and erythritol, as shown in Table 8, below. Samples of both variants were evaluated by two people familiar with taste testing cola beverages, including diet cola beverage taste testing.

TABLE 8

| Ingredients | Diet Cola Control Beverage | Diet Cola Beverage with D-Psicose and Erythritol |
|---|---|---|
| Sodium benzoate | 2.04 g | 2.04 g |
| Phosphoric acid | 4.41 g | 4.41 g |
| Caffeine | 1.27 g | 1.27 g |
| Citric acid | 1.27 g | 1.27 g |
| Cola flavor | 38.63 g | 38.63 g |
| Rebaudioside A* | 0.45 g | 0.45 g |
| Rebaudioside D* | 1.05 g | 1.05 g |
| Rebaudioside M | 1.5 g | 1.5 g |
| D-Psicose | 0 | 120 g |
| Erythritol | 0 | 120 g |
| Treated water | q.s. to 1 L | q.s. to 1 L |

Example 7. Part B. Two people familiar with taste testing cola beverages, including diet cola beverage taste testing, tasted the samples of Variant 1 and Variant 2. Variant 2 was found to have a better sweetness taste profile and mouthfeel than Variant 1.

Example 8. A ready-to-drink low calorie, frozen beverage containing D-psicose and erythritol in accordance with one aspect of the invention of the present disclosure is prepared from a concentrate syrup shown in Table 9, below. The concentrate syrup of Table 9 is diluted with water in a 1-plus-5 throw to produce a beverage mixture. The beverage mixture is then poured into the hopper of a frozen beverage unit to generate frozen beverage which is dispensed and further flavored by adding flavored syrup.

TABLE 9

| Ingredients | Amount |
|---|---|
| Sodium benzoate | 2.88 g |
| Citric acid anhydrous | 3.98 g |

TABLE 9-continued

| Ingredients | Amount |
|---|---|
| Rebaudioside M | 0.5 g |
| D-Psicose | 120 g |
| Erythritol | 120 g |
| HFCS | 570 g |
| Treated water | q.s. to 2 L |

Example 9. A sweetener composition suitable for use in bulk in food preparation or as a table-top sweetener, comprising D-psicose and erythritol in accordance with one aspect of the invention of the present disclosure, is prepared with the formulation shown in Table 10, below. The sweetener composition of Table 10 is suitable for use as an ingredient in cooking or for addition to water or other liquids or to other food for immediate consumption. The sweetener composition can be packaged in bulk or in packets each containing a suggested single serving size. Optionally a trace amount of flavoring (e.g., not more than 0.01 g) or a larger concentration of flavoring can be added to the formulation shown in Table 10.

TABLE 10

| Ingredient | Amount |
|---|---|
| Erythritol | 1.745 g |
| D-Psicose | 1.745 g |
| Rebaudioside M | 0.0175 g |
| Total weight | 3.5075 |

Example 10. Diet frozen carbonated beverage is prepared in accordance with one aspect of the invention of the present disclosure. Beverage syrup for the frozen carbonated beverage is prepared by adding erythritol (3.5% by weight of finished beverage) and D-Psicose (2.1% by weight of finished drink) to 1.0 gallon of unsweetened lemon-lime CSD base (e.g., Diet Mountain Dew® base or other lemon-lime CSD base). The solution is stirred until complete dissolution has occurred. Rebaudioside M (500 ppm of finished beverage) is added, and again the solution is stirred until complete dissolution is achieved. The syrup thus prepared is placed into a frozen carbonated beverage machine ("FCB Dispenser") configured to add carbonated water to the syrup at the time of dispensing ready-to-drink servings of the finished frozen carbonated beverage. The resulting ready-to-drink servings of the finished frozen carbonated beverage have good carbon dioxide overrun, smooth, creamy mouthfeel and excellent taste. The syrup is then successively run through the FCB Dispenser to consistently achieve high quality ready-to-drink servings of finished frozen carbonated beverage.

Given the benefit of the above disclosure and description of exemplary embodiments, it will be apparent to those skilled in the art that numerous alternative and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional usage in patents of meaning "at least one" unless in a particular instance it is clear from context that the term is intended in that particular instance to mean specifically one and only one. Likewise, in accordance with traditional usage the term "comprising" is used here an open ended, i.e., not excluding additional items, features, components, etc., while the term "consisting of" is closed ended, excluding additional items, features, components, etc. Likewise, also in accordance with traditional usage, the term "consisting essentially of" limits to the recited material(s) or step(s) but also allows the optional inclusion of material(s) or step(s) that do not materially affect the basic and novel characteristic(s) of the claimed invention.

What is claimed is:

1. A ready-to-drink beverage product comprising:
   carbonated water,
   D-psicose in an at least a sweetening amount, but not more than 2.1 wt. %,
   erythritol in an at least a sweetening amount, but not more than 3.5 wt. %,
   acidulant comprising at least one acid,
   rebaudioside M in a concentration between about 50 ppm and about 600 ppm,
   a sweetening amount of rebaudioside D,
   a sweetening amount of rebaudioside A, and
   wherein the beverage product has a pH between 3.0 and 3.5.

2. The ready-to-drink beverage product according to claim 1, wherein rebaudioside M is present in a concentration of about 100 ppm, about 200 ppm, about 300 ppm, about 400 ppm, or about 500 ppm.

3. The ready-to-drink beverage product according to claim 1, wherein rebaudioside A is present in an amount up to 0.05 wt. % and rebaudioside D is present in an amount up to 0.05 wt. %.

4. The ready-to-drink beverage product according to claim 1, wherein rebaudioside A is present in an amount of 0.01 wt. % to 0.03 wt. % and rebaudioside D is present in an amount of 0.01 wt. % to 0.03 wt. %.

5. The ready-to-drink beverage product according to claim 1, wherein D-psicose is present in an amount of 0.5 wt. % to 2.1 wt. %, erythritol is present in an amount of 0.5 wt. % to 3.5 wt. %, rebaudioside M is present in an amount of 0.02 wt. % to 0.06 wt. %, rebaudioside A is present in an amount of 0.01 wt. % to 0.05 wt. %, and rebaudioside D is present in an amount of 0.01 wt. % to 0.05 wt. %.

6. The ready-to-drink beverage product according to claim 1, wherein rebaudioside M provides at least 60% of the total sweetening of the ready-to-drink beverage product.

7. The ready-to-drink beverage product according to claim 6, wherein rebaudioside M provides at least 80% of the total sweetening of the ready-to-drink beverage product.

8. The ready-to-drink beverage product according to claim 1, wherein a weight ratio of rebaudioside D to rebaudioside A is about 7:3.

9. The ready-to-drink beverage product according to claim 1, wherein the acidulant comprises at least one acid selected from the group consisting of phosphoric acid, citric acid, malic acid, tartaric acid, lactic acid, fumaric acid, ascorbic acid, gluconic acid, succinic acid, maleic acid, adipic acid, cinnamic acid, glutaric acid, and any mixture thereof.

10. The ready-to-drink beverage product according to claim 9, wherein the acidulant comprises phosphoric acid and citric acid.

11. The ready-to-drink beverage product according to claim 1, wherein the product comprises a flavoring.

12. The ready-to-drink beverage product according to claim 1, wherein the product comprises at least one additional ingredient selected from the group consisting of fruit juice, vegetable juice, pulp, colorants, vitamins, minerals, electrolytes, D-tagatose, and glycerine.

13. The ready-to-drink beverage product according to claim 12, wherein the product comprises a juice selected from fruit juice, vegetable juice, and berry juice.

14. The ready-to-drink beverage product according to claim 1, wherein the product comprises caffeine.

15. The ready-to-drink beverage product according to claim 1, wherein the product comprises a preservative selected from the group consisting of a benzoate, a sorbate, a citrate, a polyphosphate, and any mixture thereof.

16. The ready-to-drink beverage product according to claim 1, wherein the product further comprises an antioxidant selected from the group consisting of ascorbic acid, ethylenediaminetetraacetic acid (EDTA), butylated hydroxyanisole (BHA), butylated hydroxytoluene (BHT), tert-butylhydroquinone (TBHQ), dehydroacetic acid, dimethyldicarbonate, ethoxyquin, heptylparaben, and any combination thereof.

17. A beverage syrup suitable for dilution to produce the ready-to-drink beverage product according to claim 1 by diluting the syrup with carbonated water in a 1-plus-5 throw, the beverage syrup comprising:

a. D-psicose in a concentration six times greater than the concentration of D-psicose in the ready-to-drink beverage product;
   b. erythritol in a concentration six times greater than the concentration of erythritol in the ready-to-drink beverage product;
   c. an acidulant in a concentration six times greater than the concentration of the acidulant in the ready-to-drink beverage product; and
   d. rebaudioside M in a concentration six times greater than the concentration of rebaudioside M in the ready-to-drink beverage product.

18. A beverage syrup suitable for dilution to produce the ready-to-drink beverage product according to claim 3 by diluting the syrup with carbonated water in a 1-plus-5 throw, the beverage syrup comprising:

a. D-psicose in a concentration six times greater than the concentration of D-psicose in the ready-to-drink beverage product;
   b. erythritol in a concentration six times greater than the concentration of erythritol in the ready-to-drink beverage product;
   c. an acidulant in a concentration six times greater than the concentration of the acidulant in the ready-to-drink beverage product;
   d. rebaudioside M in a concentration six times greater than the concentration of rebaudioside M in the ready-to-drink beverage product;
   e. rebaudioside A in a concentration six times greater than the concentration of rebaudioside A in the ready-to-drink beverage product; and
   f. rebaudioside D in a concentration six times greater than the concentration of rebaudioside D in the ready-to-drink beverage product.

* * * * *